(12) United States Patent
Salsbury

(10) Patent No.: US 8,825,185 B2
(45) Date of Patent: Sep. 2, 2014

(54) DELAY COMPENSATION FOR FEEDBACK CONTROLLERS

(75) Inventor: Timothy Salsbury, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 892 days.

(21) Appl. No.: 12/984,480

(22) Filed: Jan. 4, 2011

(65) Prior Publication Data

US 2012/0170639 A1 Jul. 5, 2012

(51) Int. Cl.
*G05B 13/02* (2006.01)
*G05B 13/04* (2006.01)

(52) U.S. Cl.
CPC .................................. *G05B 13/048* (2013.01)
USPC ................... 700/55; 700/31; 700/37; 700/41; 700/45

(58) Field of Classification Search
CPC .. G05B 13/041; G05B 13/042; G05B 13/047; G05B 13/048; G05B 11/36; G05B 11/38; G05B 11/40; G05B 11/42
See application file for complete search history.

(56) References Cited

U.S. PATENT DOCUMENTS

| | | | | |
|---|---|---|---|---|
| 5,166,873 | A | * | 11/1992 | Takatsu et al. ................... 700/31 |
| 5,274,314 | A | * | 12/1993 | Maqueira ....................... 318/632 |
| 5,355,305 | A | | 10/1994 | Seem et al. |
| 5,506,768 | A | | 4/1996 | Seem et al. |
| 5,568,377 | A | | 10/1996 | Seem et al. |
| 5,568,378 | A | * | 10/1996 | Wojsznis ......................... 700/44 |
| 6,219,590 | B1 | | 4/2001 | Bernaden, III et al. |
| 6,540,148 | B1 | | 4/2003 | Salsbury et al. |
| 6,647,318 | B2 | | 11/2003 | Salsbury |
| 6,937,909 | B2 | | 8/2005 | Seem |
| 7,024,254 | B2 | | 4/2006 | Salsbury et al. |
| 7,024,336 | B2 | | 4/2006 | Salsbury et al. |
| 7,031,880 | B1 | | 4/2006 | Seem et al. |
| 7,289,936 | B2 | | 10/2007 | Singhal et al. |
| 7,496,472 | B2 | | 2/2009 | Seem |
| 7,505,877 | B2 | | 3/2009 | Salsbury |
| 7,542,876 | B2 | | 6/2009 | Singhal et al. |
| 7,729,882 | B2 | | 6/2010 | Seem |
| 7,847,681 | B2 | | 12/2010 | Singhal et al. |
| 7,865,334 | B2 | | 1/2011 | Singhal et al. |
| 2004/0102935 | A1 | * | 5/2004 | Lacroix et al. ..................... 703/2 |
| 2009/0132064 | A1 | * | 5/2009 | Ydstie ............................. 700/42 |

OTHER PUBLICATIONS

Astrom et al, "PID Controllers, 2nd Edition", 1995, pp. 230-272, Instrument Society of America.
Hagglund, T., "An Industrial Dead Time Compensating PI Controller", Control Engineering Practice, 1996, pp. 749-756, vol. 4, No. 6.

* cited by examiner

*Primary Examiner* — Sean Shechtman
(74) *Attorney, Agent, or Firm* — Foley & Lardner LLP

(57) ABSTRACT

A control system for using a predictive control with a control process having a time delay includes an adaptive feedback controller and a predictor. The predictor uses at least an adaptively updated control parameter from the adaptive feedback controller to predict the output of the control process during the time delay. The control system further includes a filter that dampens the rate of change of the adaptively updated control parameter provided to the predictor from the adaptive feedback controller to slow the adaptation of the predictor relative to the adaptation of the adaptive feedback controller.

20 Claims, 3 Drawing Sheets

DELAY COMPENSATION FOR FEEDBACK CONTROLLERS

BACKGROUND

The present invention relates generally to the field of feedback controllers.

Feedback controllers are used to control variable devices such as valves, pumps, and dampers in control systems or processes (e.g., a heating and cooling system). The object of such controllers is to control the device in a way that maintains a controlled variable (e.g., temperature, humidity, flow rate, pressure, etc.) at a desired setpoint. Many feedback controllers respond to feedback based on one or more control parameters. A common control parameter used in feedback algorithms is proportional gain (i.e., the proportional term, the gain, etc.)—a value that is used by a feedback algorithm to determine the magnitude of the adjustment to the controlled signal given the error signal. For example, when provided the same error signal, a feedback algorithm with a high gain generally results in a large adjustment to the controlled signal while a small gain generally results in a small adjustment to the controlled signal. In addition to the proportional gain, other control parameters such as integral term or derivative term are often used by feedback algorithms (e.g., in proportional plus integral (PI) control algorithms, in proportional-integral-derivative (PID) control algorithms, etc.).

In dynamic systems (e.g., wherein conditions outside of the control loop are affecting the controlling variable or where an aspect of the control loop is variably imperfect), the optimal control parameters for the feedback algorithm are also dynamic. Accordingly, some feedback controllers or feedback algorithms are periodically tuned (e.g., manually, automatically) based on observed historical behavior of the system. Other feedback controllers or feedback algorithms include adaptive tuning algorithms that automatically adjust the control parameters during normal operation of the feedback algorithm. Such adaptive tuning algorithms can provide for improved performance relative to tuning algorithms that run only periodically.

SUMMARY

One embodiment of the invention relates to a system for using a predictive control with a control process having a time delay. The system includes an adaptive feedback controller and a predictor. The predictor uses at least an adaptively updated control parameter from the adaptive feedback controller to predict the output of the control process during the time delay. The system further includes a filter that dampens the rate of change of the adaptively updated control parameter provided to the predictor from the adaptive feedback controller to slow the adaptation of the predictor relative to the adaptation of the adaptive feedback controller. The adaptively updated gain parameter may be a gain parameter for the feedback controller. The adaptive feedback controller, predictor, and filter may be stored in non-transitory computer readable media and executable by a processor in communication with the computer readable media; wherein the system comprises a control process output interface and a control process input interface. The adaptive feedback controller, predictor, and filter may be computer code modules stored on non-transitory computer readable media and configured for execution by a processor. The predictor may be a Smith predictor that uses a first-order plus time delay (FOPTD) model for providing the effect of a derivative term to the adaptive feedback controller. The adaptive feedback controller may drive a feedback loop to cause an output variable of the control process to track a setpoint. The adaptive feedback controller may also use an adaptive loop to updates its adaptively updated control parameter (e.g., a gain parameter) to account for changing control process dynamics. The adaptive loop may be configured to be slower than the feedback loop and the predictive loop provided by the predictor and the filter may be configured to be slower than the adaptive loop. The filter's time constant may be set as a multiple of the dominant time constant of the control process. The multiple may be equal to or greater than about sixty five. The time constant of the filter may be held constant. In other embodiments, the dominant time constant of the control process may be periodically updated based on a calculation by a time constant calculation module and the filter's time constant may be updated in response to the update of the dominant time constant of the control process.

Another embodiment of the invention relates to a method for using a predictive control with a control process having a time delay. The method includes operating the control process using an adaptive feedback controller. The method further includes using a predictor to dampen the rate of change of the adaptive feedback controller. The method also includes outputting at least one adapted parameter from the adaptive feedback controller. The method yet further includes filtering the at least one adapted parameter from the adaptive feedback controller to dampen the rate of change of the adapted parameter. The method also includes updating the predictor using the dampened adapted parameter to slow the adaptation of the predictor relative to the adaptation of the adaptive feedback controller. The filtering may be completed by a filter in communication with the adaptive feedback controller and the predictor and the filter, adaptive feedback controller, and the predictor may be stored in non-transitory computer readable media for execution by a computer processor. The predictor may be a Smith predictor that uses a first-order plus time delay (FOPTD) model for providing the effect of a derivative term to the adaptive feedback controller. The filter's time constant may be set as a multiple of the dominant time constant of the control process. The multiple may be equal to or greater than about sixty five. In some embodiments, the method may include periodically updating the dominant time constant of the control process and updating the filter's time constant in response to the update of the dominant time constant of the control process.

Yet another embodiment of the invention relates to a system for operating a control process having a long time delay. The system includes an adaptive feedback controller that uses an error between a setpoint and a plant's output to calculate a manipulated variable output for the plant, wherein the adaptive feedback controller adaptively updates at least one control parameter. The system yet further includes a predictor that applies the manipulated variable output from the adaptive feedback controller to a model that of the plant's output, wherein the predictor uses the model to predict where the plant's output will move in a subsequent time period. The system also includes a compensator that modifies the error used by the adaptive feedback controller using a modifier from the predictor. The system yet further includes a filter configured to receive the updates of the at least one control parameter, to dampen the rate of change of the updated at least one control parameter, and to provide the dampened and updated at least one control parameter to the predictor to update the model used by the predictor. The adaptive feedback controller may be a proportional-integral (PI) controller and the predictor, filter, and compensator are configured to provide the effects of a derivative term to the PI controller despite the control process's time delay.

The filter may be configured to cause the time constant of the predictor to be a multiple greater than the dominant time constant of the plant. In some embodiments, the filter causes the time constant of the predictor to be at least about sixty five times the dominant time constant of the plant.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limited.

PID controllers can work well for a wide range of building systems. For example, PID controllers can be used to control building variables such as temperature, pressure, flow rates, humidity, and the like. The performance of PID controllers can deteriorate when there is time delay in the plant being controlled. One example of a control process where a long delay can impact system performance is a cooling tower control process where the control sensor (e.g., fluid temperature sensor) is located a long distance from the cooling tower (e.g., the variably adjusted cooling tower fans). These systems have a long transport delay (the time it takes changed temperature fluid to travel along the pipes to the sensor location) and a long thermodynamic delay (the time it takes changes in cooling tower fan speed to effect change in the fluid's temperature). The existence of significant delays is most problematic for the derivative part (or D term). Although PI controllers can provide stable control for systems with long time delays, control performance can deteriorate when delays are large relative to the control process's time constant.

Figure 1:
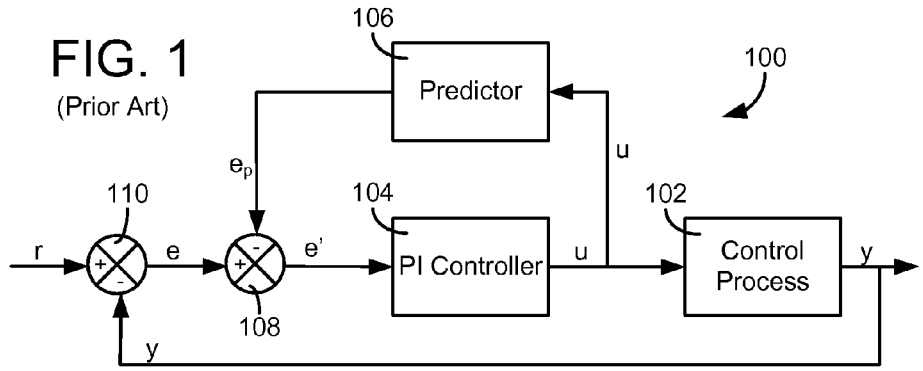
FIG. 1 is a block diagram of a system wherein a Smith predictor works with a PI controller to operate a control process having a long time delay. Both the PI controller and the Smith predictor of FIG. 1 require manual tuning by process engineers and can be detuned by changing control process dynamics.

In order to improve control performance for systems with long time delays, some control engineers utilize a solution such as that shown in FIG. 1. System 100 includes a control process 102. Control process 102 conducts some change based on a manipulated variable u provided from PI controller 104 to the control process 102. The change results in an updated output variable y. In the illustration of FIG. 1, a setpoint r is compared with output variable y at element 110 to determine an error e. PI controller 104 generally uses error e in an attempt to adjust the manipulated variable u to eliminate the error e. In systems where the time constant of control process 102 is not long, PI controller 104 may be a PID controller having a derivative term (D) intended to damp anticipated future oscillations of e.

In systems where the time delay of the control process is long, predictor 106 is provided to compensate for the time between manipulated variable changes and observations in error reductions. Predictor 106 conducts such compensation by using manipulated variable u to predict what the output of control process 102 is while the delayed output variable y is making its way back to the system. Predictor 106 modifies e with the predicted error $e_p$ at element 108 to provide e', where e' is less drastic than e. Such damping of e during a period of delay associated with control process 102 can help prevent overshoot (e.g., relative to a situation where PI controller 104 assumes that the error e is not reducing in response to changes in u during the delay period).

Predictor 106 is known in the art as a Smith predictor. Additional details and considerations regarding Smith predictors can be found in Åström et al., PID Controllers (1995, second ed.) or Hägglund, *An Industrial Dead Time Compensating PI Controller*, Control Engineering Practice, Vol. 4, No. 6, pages 749-756 (1996). A Smith predictor solution, however, requires that control engineers set a number of predictor model parameters (e.g., the time delay of the control process, the static gain of the control process, the time constant of the control process, etc.) in addition to the proportional gain and integral gain parameters for the PI controller.

Figure 2:
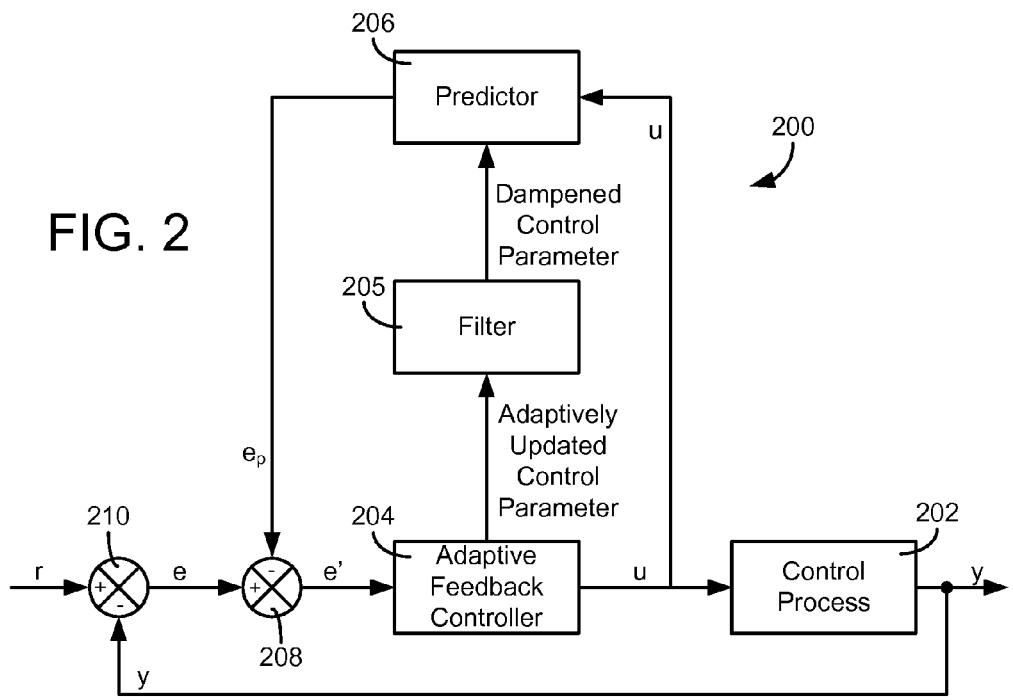
FIG. 2 is a block diagram of a system according to an exemplary embodiment of the invention. The system of FIG. 2 uses a predictive control with an adaptive feedback controller to operate a control process having a long time delay. The system of FIG. 2 requires fewer manually tuned parameters and better adapts to changing control process dynamics relative to the system of FIG. 1.

Referring now to FIG. 2, a system 200 for operating a control process 202 having a relatively long dominant time constant is shown, according to an exemplary embodiment of the invention. System 200 includes an adaptive feedback controller 204. The system of FIG. 1, by contrast, does not include an adaptive feedback controller or an adaptive tuner. In other words, PI controller 104 of FIG. 1 must be manually tuned. Adaptive feedback controller 204 may be a pattern recognition adaptive controller as described in U.S. Pat. Nos. 5,355,305, 5,506,768, 6,937,909, or other resources. System 200 further includes control process 202, and elements 208, 210 which may be the same as or similar to control process 102 and elements 108, 110 of FIG. 1.

System 200 also includes a predictor 206. Predictor 206 is configured to receive an adaptively updated control parameter from the adaptive feedback controller 204. The adaptively updated control parameter provided from adaptive feedback controller 204 is provided to predictor 206 via filter 205. Filter 205 dampens the rate of change of the adaptively updated gain parameter provided to predictor 206 from the adaptive feedback controller 204. Such damping advantageously slows the adaptation of the predictor 206 relative to the adaptation of the adaptive feedback controller 204. Such damping allows the adaptive tuning provided by the adaptive feedback controller to stabilize or "catch up" with dynamics associated with a changing predictive model. In other words, filter 205 causes the predictive loop existing in-part between adaptive feedback controller 204 and predictor 205 to run at a slower adaptation rate than the adaptive loop internal to the adaptive feedback controller. Modification of the predictor model is slower than modification of control parameters with the adaptive feedback controller to reduce interference between the adaptive loop and the predictive loop. A variety of different filter types may be used to dampen the rate of change of the adaptively updated control parameters provided to predictor 206. In the embodiment of FIG. 2, the filter is a first order filter that generates filtered versions of one or more adaptively updated control parameters.

Figure 3:
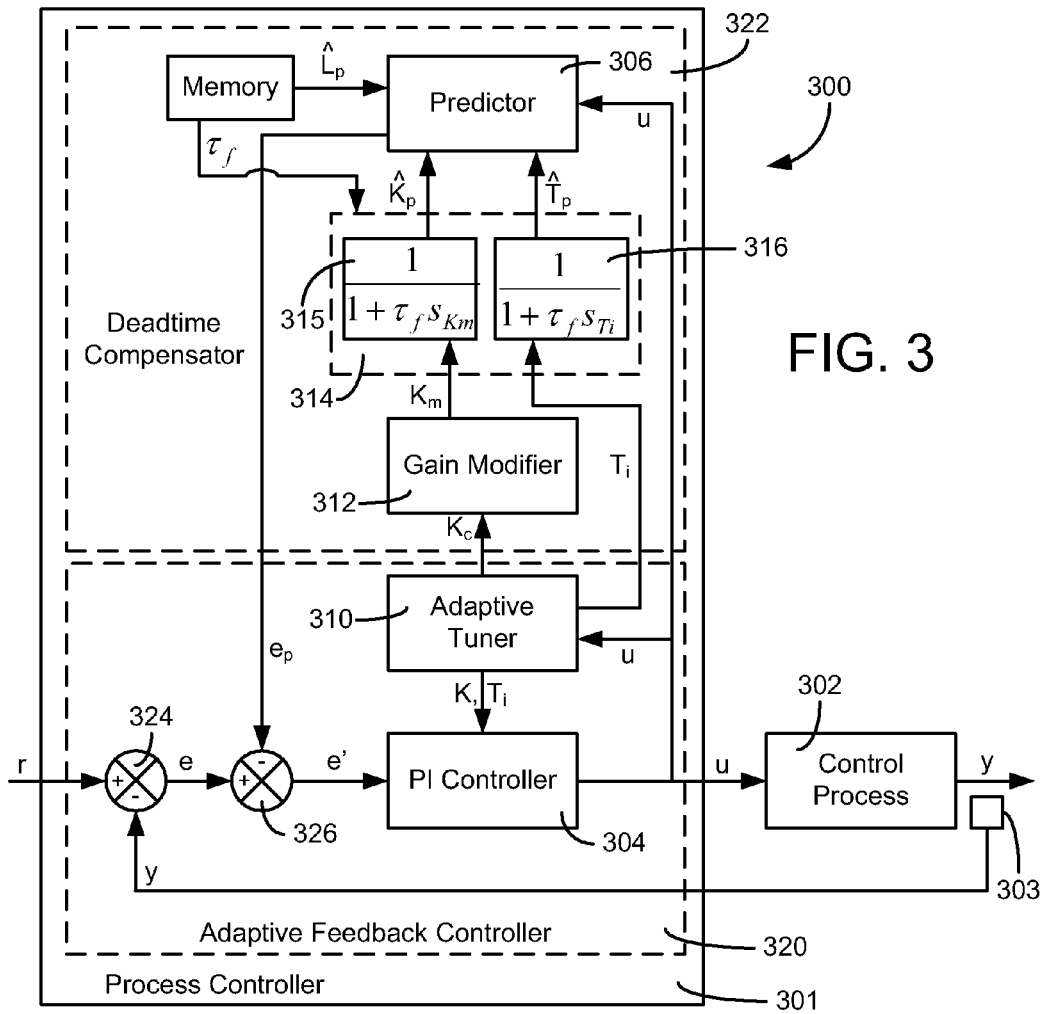
FIG. 3 is a detailed block diagram of a system that uses predictive control with an adaptive feedback controller to operate a control process having a long time delay.

Referring now to FIG. 3, a system 300 for operating a control process 302 is shown in greater detail, according to an exemplary embodiment. System 300 includes a process controller 301 including an adaptive feedback controller 320 (e.g., a pattern recognition adaptive controller (PRAC), a model recognition adaptive controller (MRAC), another type of tuning or adaptive feedback controller, etc.) and a deadtime compensator 322. Adaptive feedback controller 320 includes a PI controller 304 for providing a manipulated variable to control process 302 and an adaptive tuner 310 for adaptively tuning control parameters of the PI controller 304. In the embodiment shown in FIG. 3, the adaptively tuned control parameters are PI controller gain K and PI controller integral time $T_i$. Deadtime compensator 322 includes a gain modifier 312 and a filter 314 for receiving an input from the adaptive tuner and adjusting the input for predictor 306. Gain modifier 312 and filter 314 of FIG. 3 are configured to dampen the rate of change of the gain parameter provided by PI controller 304 (e.g., configured to perform the functions of filter 205 of FIG. 2).

System 300 includes a sensor 303 detecting the output y of control process 302. Sensor 303 provides the output y to element 324 which compares the output y to the setpoint r. Element 324 determines an error e and provides the error to element 326, which compares the error e to the predicted error $e_p$ and determines a modified error e' to provide to PI controller 304.

PI controller 304 receives a modified error e' from element 326, a controller gain K from adaptive tuner 310 and an integral time $T_i$ from adaptive tuner 310. PI controller 204 provides control process 302 with a manipulated variable u. PI controller 304 further provides the output to adaptive tuner 310 and predictor 306.

Adaptive tuner 310 receives the manipulated variable u from PI controller 204 and adaptively tunes the manipulated variable u. Adaptive tuner 310 provides a controller gain K and integral time $T_i$ output back to PI controller 204 for updating the control parameter. Adaptive tuner 310 further provides the controller gain $K_c$ to gain modifier 312. Gain modifier 312 receives an input from adaptive tuner 310 and modifies the controller gain $K_c$. Gain modifier 312 determines a modified gain $K_m$ using the equation $$K_m = \frac{u_{max} - u_{min}}{K_c},$$

where $u_{max}$ and $u_{min}$ are maximum and minimum values of the manipulated variable u, to determine an updated plant gain estimate $K_m$. The plant gain estimate $K_m$ is provided to filter 314.

Filter 314 is shown to include two separate filters 315 and 316. Filter 315 receives the plant gain estimate $K_m$ from gain modifier 312. Filter 315 may take the form of $$K_p = \frac{1}{1 + \tau_f s_{Km}},$$

where $\tau_f$ is the filter time constant and $s_{Km}$ is a continuous variable based on $K_m$. Filter 315 is a first-order filter according to the exemplary embodiment shown in FIG. 3. Other filters having other orders could be used to provide varying dampening effects to the adaptively updated control variable (e.g., gain) output by adaptive feedback controller 320. Filter 315 outputs static gain $K_p$ that is dampened relative to the adaptively updated gain $K_c$ output from adaptive feedback controller 320.

Filter 316 receives a second adaptively updated control parameter from adaptive tuner 310. As shown in FIG. 3, the adaptively updated control parameter of integral time ($T_i$) is received from adaptive tuner 310 at filter 316. Filter 316 may take the form of $$K_p = \frac{1}{1 + \tau_f s_{Ti}},$$

where $\tau_f$ is the filter time constant and $s_{Ti}$ is a continuous variable based on $T_i$. Filter 316 outputs $\hat{\tau}_p$ for predictor 206. While filter 316 is also shown as a first-order filter in FIG. 3, other filters having other orders could be used to provide varying dampening effects relative to $T_i$. Further, while filters 315 and 316 are shown as being of the same form and order, in other embodiments filters 315 may be of different forms or orders relative to each other.

Filters 315 and 316 both utilize a filter time constant $\tau_f$. Filter time constant $\tau_f$ may be user specified or automatically determined (e.g., provided by memory 328). In either case, the filter time constant $\tau_f$ may be based on the dominant time constant of control process 302. In an exemplary embodiment, the filter time constant $\tau_f$ is set to equal a predetermined multiple of the dominant time constant $\tau_p$ of control process 302 (e.g., $\tau_f = \lambda \tau_p$ where λ is the multiple). In some embodiments, the multiple and resulting filter time constant $\tau_f$ is set such that the delay of filter 314 (including filters 315, 316) causes the time constant of predictor 306 (or a loop controlled by predictor 306) to be a multiple greater than the dominant time constant of control process 302. In some embodiments, multiple λ values of at least about sixty five (i.e., sixty five times the dominant time constant of the plant or control process) may reduce the integrated absolute error of the setpoint error relative to multiple λ values below sixty five. With multiple λ values in excess of sixty five (e.g., eighty) the integrated absolute error may remain consistently low and the predictive and adaptive algorithms may reliably converge.

The embodiment shown in FIG. 3 advantageously provides predictor model updating (i.e., estimating, tweaking, adapting) that is automated with respect to the gain and integral time parameters used by predictor 306. In the embodiment shown in FIG. 3, only time delay $L_p$ and the dominant time constant of control process 302 $\tau_p$ may require some user input and/or testing for predictor 306 to operate in proper time with adaptive tuner 310, PI controller 304, and/or control process 302. However, time delay $L_p$ and time constant $\tau_p$ are typically needed to determine a proper sampling period for adaptive feedback controllers. In such instances, therefore, the addition and implementation of deadtime compensator 322 requires very little extra in the way of human driven calculation or tuning. Furthermore, time delay estimates made by engineers may only need to be plus or minus fifty percent of the true time delay of the process to significantly reduce integrated absolute error. In a similar manner, an engineer's estimate of time constant $\tau_p$ may be relatively forgiving. While time constant estimates that are too small may cause the integrated absolute error to spike, time constant values that are greater than about one third of the true value through ten times and greater than the true value can result in good integrated absolute error values relative to time constant estimates that are less than one third of the true value. It should be noted, however, that knowledge of the time delay to set the sample period can result in improved performance. Testing has shown that the sample period of the adaptive PI controller should be set based on knowledge of the time delay and that the ratio of the time delay $L_p$ to the time constant $\tau_p$ should not be allowed to exceed two. The static gain $K_p$ therefore has a dampened rate of change compared to the controller gain $K_c$ provided by the adaptive feedback controller. When time delay $L_p$ and time constant $\tau_p$ are appropriately set, the dead-time compensation provided by adaptive tuner 310 and deadtime compensator 322 may lead to faster initial tuning, more stable ongoing control in response to system dynamics or disturbances, as well as the I integrated absolute error improvement mentioned above.

Figure 4:
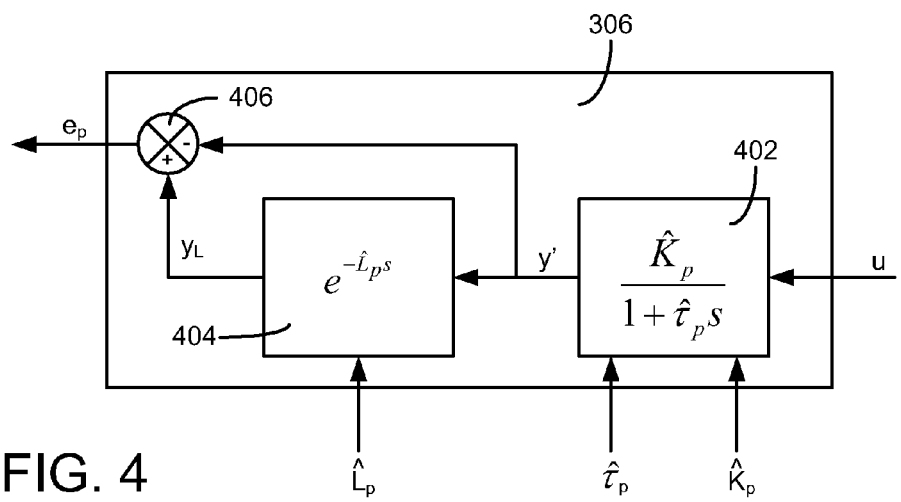
FIG. 4 is a block diagram of the predictor shown in FIG. 3, according to an exemplary embodiment.

Referring now to FIG. 4, predictor 306 is shown in greater detail, according to an exemplary embodiment. Predictor 306 is shown as implementing a first-order plus time delay (FOPTD) model of the plant. Predictor 306 receives four inputs: the manipulated variable u from PI controller 304, the time delay $L_p$ of the system from memory 328, the filtered gain $\hat{K}_p$, and the time constant $\tau_p$. Predictor 306 uses the four parameters to determine the predicted error $e_p$ of the system.

Predictor 306 uses the gain $\hat{K}_p$ and the time constant $\tau_p$ in the following equation of block 402

$$\frac{\hat{K}_p}{1+\hat{\tau}_p s},$$

where s is a continuous variable based on the manipulated input u and a time sample. Using the above equation 402, a predicted control process 302 y' output is determined.

The equation in block 404 is used to determine the effect of time delay on the predicted error $e^{-L_p s}$ where $L_p$ is the time delay received by predictor 306 and s is the continuous variable of y'. The above equation is intended to simulate the effect the time delay will have on y (e.g., a prediction of what the output y of the control process 302 will be in the future). The output $y_L$ of block 404 is compared to the output y' from block 402 at element 406, and the difference in predicted control process 302 outputs is designated as the predicted error $e_p$ of control process 302. The predicted error $e_p$ is compared to the error e calculated (e.g., the difference between the output variable y and the setpoint r) to determine the error to input into PI controller 304.

Figure 5:
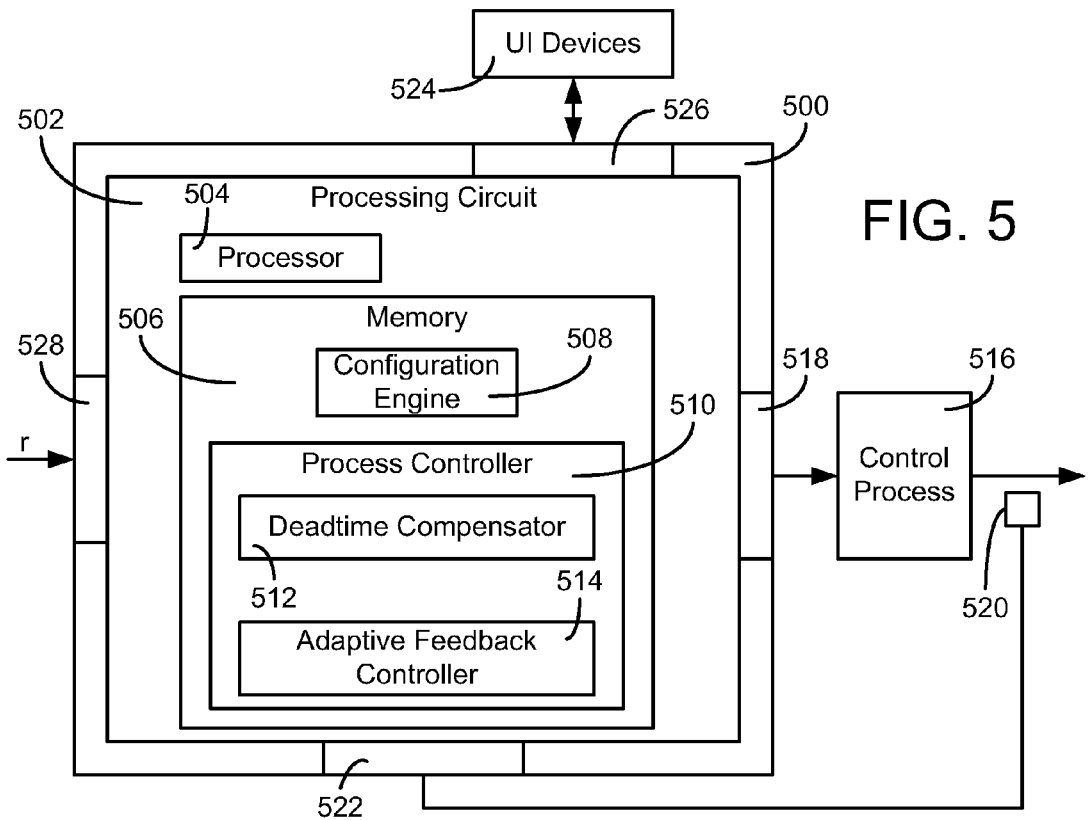
FIG. 5 is a block diagram of a system that uses predictive control with an adaptive feedback controller to operate a control process having a long time delay, according to an exemplary embodiment.

Referring now to FIG. 5, a system for operating a control process 516 having a long time delay is shown. In the system of FIG. 5, some of the components described in detail with reference to other figures are integrated within controller 500. In some embodiments, controller 500 may be a METASYS brand controller sold by Johnson Controls, Inc.

Process controller 500 is shown to include processing circuit 502. Processing circuit 502 is shown to include a processor 504 and memory 506. According to an exemplary embodiment, processor 504 and/or all or parts of processing circuit 502 can be implemented as a general purpose processor, an application specific integrated circuit (ASIC), one or more programmable logic controllers (PLCs), one or more field programmable gate arrays (FPGAs), a group of processing components, one or more digital signal processors, other suitable electronics components, or a combination thereof.

Memory 506 (e.g., memory unit, memory device, storage device, etc.) is one or more devices for storing data and/or computer code for completing and/or facilitating the various processes described in the present disclosure. Memory 506 may be or include volatile memory or non-volatile memory. Memory 506 may include database components, object code components, script components, or any other type of information structure for supporting the various activities described in the present disclosure. According to an exemplary embodiment, memory 506 is communicably connected to processor 504 via processing circuit 502 and includes computer code for executing (e.g., by processor 504) one or more processes described herein. Memory 506 may also include various data regarding the operation of one or more of the control loops relevant to the system (e.g., performance map data, historical data, behavior patterns regarding process behavior, state machine logic, start-up logic, steady-state logic, etc.).

Interfaces 518, 522, 526, 528 may be or include any number of jacks, wire terminals, wire ports, wireless antennas, or other communications interfaces for communicating information or control signals (e.g., a control signal of the manipulated variable output at interface 518, sensor information received at input interface 522, information received and sent to UI devices 524 at interface 526, setpoint information received at communications interface 528, etc.). Interfaces 518, 522, 526, 528 may be the same type of devices or different types of devices. For example, input interface 522 may be configured to receive an analog feedback signal (e.g., an output variable, a measured signal, a sensor output, a controlled variable) from a controlled process component (e.g., sensor 520) while communications interface 528 may be configured to receive a digital setpoint signal from an upstream supervisory controller. Output interface 518 may be a digital output (e.g., an optical digital interface) configured to provide a digital control signal (e.g., a manipulated variable) to a controlled process component. In other embodiments, output interface 518 is configured to provide an analog output signal. Interface 526 may be configured to provide information to and receive information from UI devices 524. In some embodiments the interfaces can be joined as three or fewer interfaces rather than four separate interfaces. For example, communications interface 528 and input interface 522 may be combined as one Ethernet interface configured to receive network communications from a supervisory controller. In other words, the supervisory controller may provide both the setpoint and process feedback via an Ethernet network. In such an embodiment, output interface 518 may be specialized for control process 516. In yet other embodiments, output interface 518 can be another standardized communications interface for communicating data or control signals. Interfaces 518, 522, 526, 528 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Memory 506 is shown to include configuration engine 508 and process controller 510. Process controller 510 is shown to include deadtime compensator 512 and adaptive feedback controller 514. Process controller 510, deadtime compensator 512, and adaptive feedback controller 514 may be configured to operate as described above with reference to FIG. 2, 3 or 4. In the embodiment shown in FIG. 5, deadtime compensator 512 and adaptive feedback controller are executable computer code modules for completing the activities described with reference to FIG. 2, 3, or 4. Deadtime compensator 512, for example, may be configured to receive or recall (e.g., from variables stored in memory 506) control parameters adaptively updated by adaptive feedback controller 514. The deadtime compensator 512 can include a predictor and filter (e.g., as described with reference to FIG. 2, 3, or 4) and deadtime compensator can affect the error used by adaptive feedback controller 514 to make control decisions. The deadtime compensator 512 can slow the updating of model parameters used by its predictor relative to the control parameter updating provided by adaptive feedback controller 514.

While interface 528 is shown as receiving setpoint r from an external source, setpoint r may be determined by one or more other schedules or control algorithms. In other embodiments, setpoint r may be user-specified and stored in memory 506 via, for example, UI devices 524 and interface 526. UI devices 524 may include electronic display devices, pointing devices, keyboards, voice-input mechanisms, or any other human-machine interface mechanism.

Configuration engine 508 may be configured to serve user interfaces to a remote source (e.g., a remote web browser, a remote thin client, a remote thick client) or to a local UI device such as an electronic display or local terminal. The user interfaces served or otherwise provided by configuration engine 508 may prompt a user for input of the variables of time delay $L_p$ and the time constant $\tau_p$. Input values for these variables may be stored in memory 506 for later use by adaptive feedback controller 514 and deadtime compensator 512. Configuration engine 508 may also be configured to assist users with updating or improving of the time delay $L_p$ and the time constant $\tau_p$ variables. For example, configuration engine 508 may be configured to track inputs from sensor 520 relative to the setpoint r to determine if the system is performing with optimal or normal bounds. If the system is not performing within optimal or normal bounds, then the configuration engine 508 can prompt the user to inspect the time delay $L_p$ and the time constant $\tau_p$ variables as a source for the performance issues. Configuration engine 508 could be configured to use measured time delays and time constants determined over a long period of time (e.g., months) to slowly tweak or adjust time delay $L_p$ and the time constant $\tau_p$ for use by adaptive feedback controller 514 or deadtime compensator 512

Figure 6:
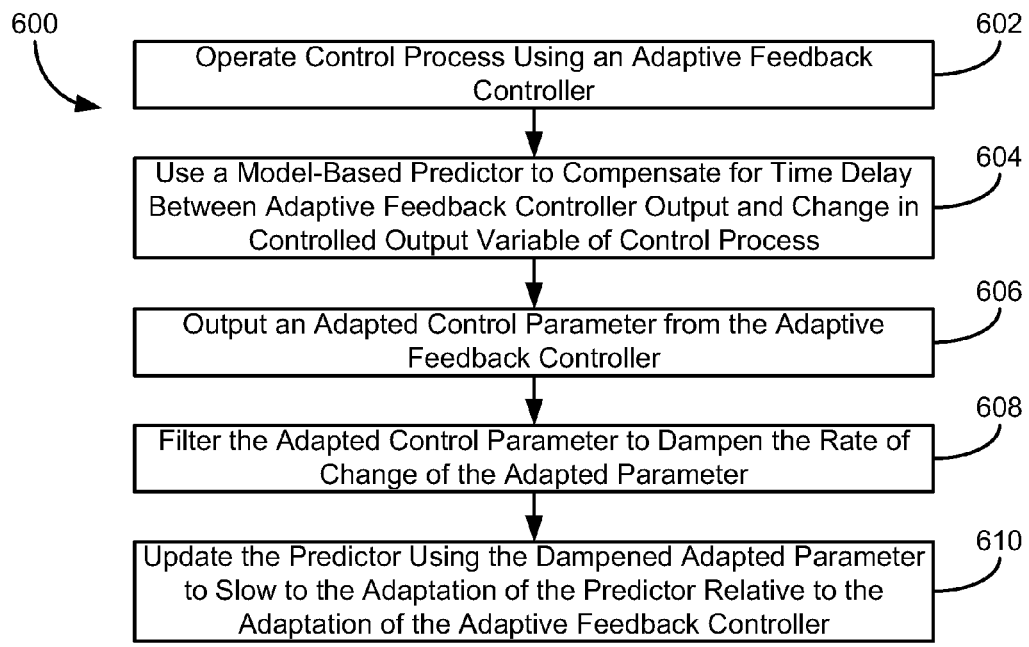
FIG. 6 is a flow chart of a method for using predictive control with an adaptive feedback controller to operate a control process having a long time delay, according to an exemplary embodiment.

FIG. 6 is a flow chart of a process 600 for using predictive control with an adaptive feedback controller to operate a control process having a long time delay, according to an exemplary embodiment. Process 600 includes operating the control process using an adaptive feedback controller (step 602). As stated above, the adaptive feedback controller can be or include a pattern recognition adaptive control (PRAC) or another type of controller (e.g., a PI controller that uses model reference adaptive control (MRAC) or a PI controller that uses self-tuning).

Process 600 further includes using a model-based predictor to compensate for time delay between adaptive feedback controller output and change in the controlled output of the control process (step 604). The model-based predictor may be as described with reference to FIGS. 1-4 or otherwise. For example, in FIG. 4 a model-based predictor that is a first order plus time delay model of the plant or control process is shown and described. Other models or predictors appropriate for the plant being controlled may be selected.

Process 600 further includes outputting an adapted control parameter from the adaptive feedback controller (step 606). The adapted control parameter or parameters output from the adaptive feedback controller may be the same control parameters that are adapted during normal operation of the adaptive feedback controller. In preferred embodiments, the control parameter updates are unimpeded by human input and are updated entirely by the adaptive tuner portion of the adaptive feedback controller.

Process 600 also includes filtering the adapted control parameters (e.g., those output in step 606) to dampen the rate of change of the adapted parameter (step 608). The filter can be a first order filter, a second order filter, a filter having a time constant that is greater than the dominant time constant of the process being controlled, or otherwise adapted to damped the rate of change of the control parameters being output by the adaptive feedback controller. Variables for the filter and/or the predictor may be calculated or set using the principles described above with reference to FIG. 3 or otherwise determined.

The predictor is then updated using the dampened adaptive parameter to slow the adaptation of the predictor relative to the adaptation of the adaptive feedback controller (step 610). As described above, process 600 may advantageously allow for a predictor to be used with a control process having a long time delay. The process of FIG. 6 can advantageously reduce the number of variables that need to be manually tuned or set by system engineers. The model of the predictor is updated automatically using output from the adaptive feedback controller, but at a rate that is slower than the adaptive feedback controller's internal updating. The delay provided by such a filtering step can allow the activity of the predictor and adaptive feedback controller to complement each other rather than diverging.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for operating a control process having a time delay, comprising:
   an adaptive feedback controller that adaptively updates a control parameter and uses the adaptively updated control parameter to calculate a manipulated variable provided from the adaptive feedback controller to the control process;
   a predictor that uses at least the adaptively updated control parameter from the adaptive feedback controller to predict the output of the control process during the time delay;
   a filter that dampens the rate of change of the adaptively updated control parameter provided to the predictor from the adaptive feedback controller to slow the adaptation of the predictor relative to the adaptation of the adaptive feedback controller.

2. The control system of claim 1, further comprising:
   a processor and non-transitory computer readable media;
   wherein the adaptive feedback controller, predictor, and filter are stored in non-transitory computer readable media and executable by a processor in communication with the computer readable media; wherein the system comprises a control process output interface and a control process input interface.

3. The control system of claim 1, wherein the adaptive feedback controller, predictor, and filter are computer code modules stored on non-transitory computer readable media and configured for execution by a processor.

4. The control system of claim 1, wherein the predictor is a Smith predictor.

5. The control system of claim 4, wherein the Smith predictor uses a first-order plus time delay (FOPTD) model for providing the effect of a derivative term to the adaptive feedback controller.

6. The control system of claim 1, wherein the adaptively updated control parameter is a gain parameter;
   wherein the adaptive feedback controller drives a feedback loop to make an output variable of the control process track a setpoint and wherein the adaptive controller uses an adaptive loop to updates its gain parameter to account for changing control process dynamics; and
   wherein the adaptive loop is configured to be slower than the feedback loop and the predictive loop provided by the predictor and the filter is configured to be slower than the adaptive loop.

7. The control system of claim 1, wherein the filter's time constant is set as a multiple of the dominant time constant of the control process.

8. The control system of claim 7, wherein the multiple is equal to or greater than sixty five.

9. The control system of claim 7, wherein the time constant of the filter is held constant.

10. The control system of claim 7, wherein the dominant time constant of the control process is periodically updated based on a calculation by a time constant calculation module and wherein the filter's time constant is updated in response to the update of the dominant time constant of the control process.

11. A method for using a predictive control with a control process having a time delay, comprising:
    operating the control process using an adaptive feedback controller;
    using the adaptive feedback controller to generate at least one adapted control parameter, to calculate a manipulated variable using the at least one adapted control parameter, and to provide the manipulated variable from the adaptive feedback controller to the control process;
    using a model-based predictor to compensate for time delay between adaptive feedback controller output and change in the controlled output variable of the control process;
    outputting the at least one adapted control parameter from the adaptive feedback controller;
    filtering the at least one adapted control parameter from the adaptive feedback controller to dampen the rate of change of the adapted parameter;
    updating the predictor using the dampened adapted parameter to slow the adaptation of the predictor relative to the adaptation of the adaptive feedback controller.

12. The method of claim 11, wherein the filtering is completed by a filter in communication with the adaptive feedback controller and the predictor; and
    wherein the filter, adaptive feedback controller, and the predictor are stored in non-transitory computer readable media for execution by a computer processor.

13. The method of claim 11, wherein the predictor is a Smith predictor that uses a first-order plus time delay (FOPTD) model for providing the effect of a derivative term to the adaptive feedback controller.

14. The method of claim 11, wherein the filter's time constant is set as a multiple of the dominant time constant of the control process.

15. The method of claim 14, wherein the multiple is equal to or greater than sixty five.

16. The method of claim 14, periodically updating the dominant time constant of the control process and updating the filter's time constant in response to the update of the dominant time constant of the control process.

17. A control system for operating a control process having a time delay, comprising:
    an adaptive feedback controller that uses an error between a setpoint and a plant's output to calculate a manipulated variable output for the plant, wherein the adaptive feedback controller adaptively updates at least one control parameter and uses the adaptively updated control parameter to calculate the manipulated variable provided from the adaptive feedback controller to the plant;
a predictor that applies the manipulated variable output from the adaptive feedback controller to a model of the plant's output, wherein the predictor uses the model to predict where the plant's output will move in a subsequent time period;
a compensator that modifies the error used by the adaptive feedback controller using a modifier from the predictor;
a filter configured to receive the updates of the at least one control parameter, to dampen the rate of change of the updated at least one control parameter, and to provide the dampened and updated at least one control parameter to the predictor to update the model used by the predictor.

18. The control system of claim 17, wherein the adaptive feedback controller is a proportional-integral (PI) controller and wherein the predictor, filter, and compensator are configured to provide the effects of a derivative term to the PI controller despite the control process's time delay.

19. The control system of claim 18, wherein the filter causes the time constant of the predictor to be a multiple greater than the dominant time constant of the plant.

20. The control system of claim 19, wherein the filter causes the time constant of the predictor to be at least sixty five times the dominant time constant of the plant.

* * * * *